(12) United States Patent
Ward

(10) Patent No.: US 6,195,242 B1
(45) Date of Patent: Feb. 27, 2001

(54) METHOD AND SYSTEM TO DETER THEFT OF CABLE TELEVISION SERVICE

(76) Inventor: Tillman C. Ward, 25 Whittier Pl., Towanda, NY (US) 14150

( * ) Notice: Subject to any disclaimer, the term of this patent is extended or adjusted under 35 U.S.C. 154(b) by 0 days.

(21) Appl. No.: 09/132,180

(22) Filed: Aug. 11, 1998

(51) Int. Cl.[7] .................................................. H02H 3/00
(52) U.S. Cl. ................................ 361/62; 361/1; 361/115; 361/119
(58) Field of Search ............................... 361/1, 119, 115, 361/62

(56) References Cited

U.S. PATENT DOCUMENTS

| | | | |
|---|---|---|---|
| 1,736,097 | 11/1929 | Shickluna | 174/41 |
| 3,328,510 | 6/1967 | White | 174/41 |
| 4,243,834 | 1/1981 | Logioco | 174/38 |
| 4,676,569 | 6/1987 | Lambert et al. | 439/133 |
| 4,785,140 | 11/1988 | Adams et al. | 174/50 |
| 5,400,212 | * 3/1995 | Hanson | 361/665 |
| 5,497,893 | 3/1996 | Mangone, Jr. | 220/3.8 |

* cited by examiner

*Primary Examiner*—Stephen W. Jackson
(74) *Attorney, Agent, or Firm*—Morris, Manning & Martin, LLP

(57) ABSTRACT

A method and system to deter cable television (CATV) service theft is disclosed. The method includes identifying a critical area along the service line of the service installation susceptible to tampering. Next a protective means is selected that will provide additional security from tampering to the critical area based on the specific characteristics of the critical area (e.g. light-weight sheathing). Finally, the protective means is applied to the critical area. The method and system are suited for protecting any utility delivered by a service line (e.g., electricity and telephone).

24 Claims, 8 Drawing Sheets

METHOD AND SYSTEM TO DETER THEFT OF CABLE TELEVISION SERVICE

FIELD OF THE INVENTION

This invention relates generally to providing a method and system to deliver a utility service line from its public distribution point to a customer in a more secure fashion, and more particularly, to deter theft of service by protecting vulnerable portions of a utility service line between a public distribution unit and a customer.

BACKGROUND OF THE INVENTION

The National Cable Television Association estimates cable theft costs the cable television ("CATV") industry $4.7 billion dollars per year. The easiest and most prevalent methods for stealing cable service are the removal of filters attached at the customers cable box or splicing the service line upstream from the filters and running a new line from that splice.

Traditionally, CATV lines piggy-back on telephone or power line poles in residential neighborhoods. Distribution boxes are placed at intervals along the CATV line. Service lines proceed from each distribution box to a plurality of customers. Traditionally, each service line is strung by itself or along a supporting stran wire to a connection point at a customer's residence. The service line is then run from the connection point to what is commonly referred to as a cable box mounted inside or on the exterior of the customer's residence. The service line connects at the cable box to the grid inside the customer's residence that distributes the CATV signal to individual outlets throughout the residence.

A service line carries the signals for all channels offered by a CATV provider as it leaves the distribution box. However, most customers only contract to receive a portion of the available channels. The most common way to customize the signal received by a customer is to connect the service line to one or more channel filters within the cable box. Each channel filter removes a range of channels from the signal carried by the service line. Accordingly, when the service line feeds into the customer's residential grid, it only carries that portion of the signal subscribed to by the customer.

The channel filter system allows flexibility in providing custom service to subscribers. Furthermore, cable linemen can easily change a customer's service by adding or removing filters from a cable box. However, the channel filter system is susceptible to cable theft.

Many times before the cable lineman leaves a neighborhood after installing CATV service, cable thieves are soliciting the new CATV customers to break into their cable boxes and remove the filters, thus providing services the customers have not contracted to receive. Not only does the cable company lose revenue based on non-payment of channel fees, but in most instances, the filters are discarded by the cable thieves. A single filter can cost up to $25.00, and therefore the loss of filters can quickly become a major expense.

Many tamper proof cable boxes have been developed to deter this easy method of cable theft. Examples include U.S. Pat. No. 5,497,893 to Mangone, Jr. (Enclosure for Cable Connections) and U.S. Pat. No. 4,785,140 to Adams, et al. (Security Box for Cable TV Connections). However, the cable thief simply refocuses his attention on the unprotected portions of the service line that can be easily reached.

If the cable box provides too great a challenge, the cable thief can splice the service line at any reachable point between the distribution box and the cable box, connect a new line to the upstream end of the service line, and run the new line to a customer's residential grid, thus bypassing the cable box filters. Exotic electronics have been devised to prevent the effectiveness of such splicing, or to scramble signals carried by the service line. Some of these systems are described in U.S. Pat. No. 4,313,132 to Doles, et al. (Cable TV Security Means) and U.S. Pat. No. 4,937,865 to Barary (Cable TV Channel Security System Having Remotely Addressable Traps). However, these methods generally involve the CATV provider purchasing and deploying expensive equipment to upgrade its systems.

Accordingly, what is needed is an inexpensive method and system for providing extra security for both new service installations and existing CATV installation that deters cable theft.

SUMMARY OF THE INVENTION

The invention is directed to a method for deterring theft of a utility service that is delivered by a service line. Critical areas of the service line susceptible to theft are identified. For each critical area, a protective means is selected to address the specific characteristics making the area vulnerable to tampering. Thereafter, the specific protective means are applied to the service line to increase the difficulty of stealing the service, thus deterring such theft.

The invention also contemplates a system to deter theft of a utility. The system includes a local distribution unit, a customer security unit, a service line leading from the local distribution unit to a structure where the service line proceeds along at least a portion of the structure to the customer security unit. The customer security unit is mounted on the structure. The local distribution unit and customer security box deter unauthorized tampering of items substantially enclosed within the unit and box. The portion of the service line proceeding along the structure runs substantially within a first sheath adapted to deter unauthorized tampering of items substantially enclosed within. The service line proceeding between the local distribution unit and the structure runs substantially within a second sheath adapted to deter unauthorized tampering of items substantially enclosed within.

One industry that can utilize the invention is the cable television industry. For a CATV implementation, the local distribution unit includes a tap, the service line is co-axial cable and the customer security unit is a cable box. The filters traditionally found in a cable box are removed and placed in series on the cable within the first sheath.

Importantly, the components of the system beyond those items normally used for CATV service installation are common, inexpensive items.

Accordingly, an object of the invention is to deter utility theft at the place where service is provided.

Another object of the invention is to prevent CATV service theft by increasing the security of a customer's CATV service installation.

Another object of the invention is to prevent CATV service theft using mechanical security means instead of electronic security means.

Another object of the invention is to use common, inexpensive items to increase the security of a CATV service installation.

Yet another object of the invention is to provide a security system which can be applied to new CATV service installations as well as pre-existing CATV service installations.

DETAILED DESCRIPTION OF THE INVENTION

Figure 1:
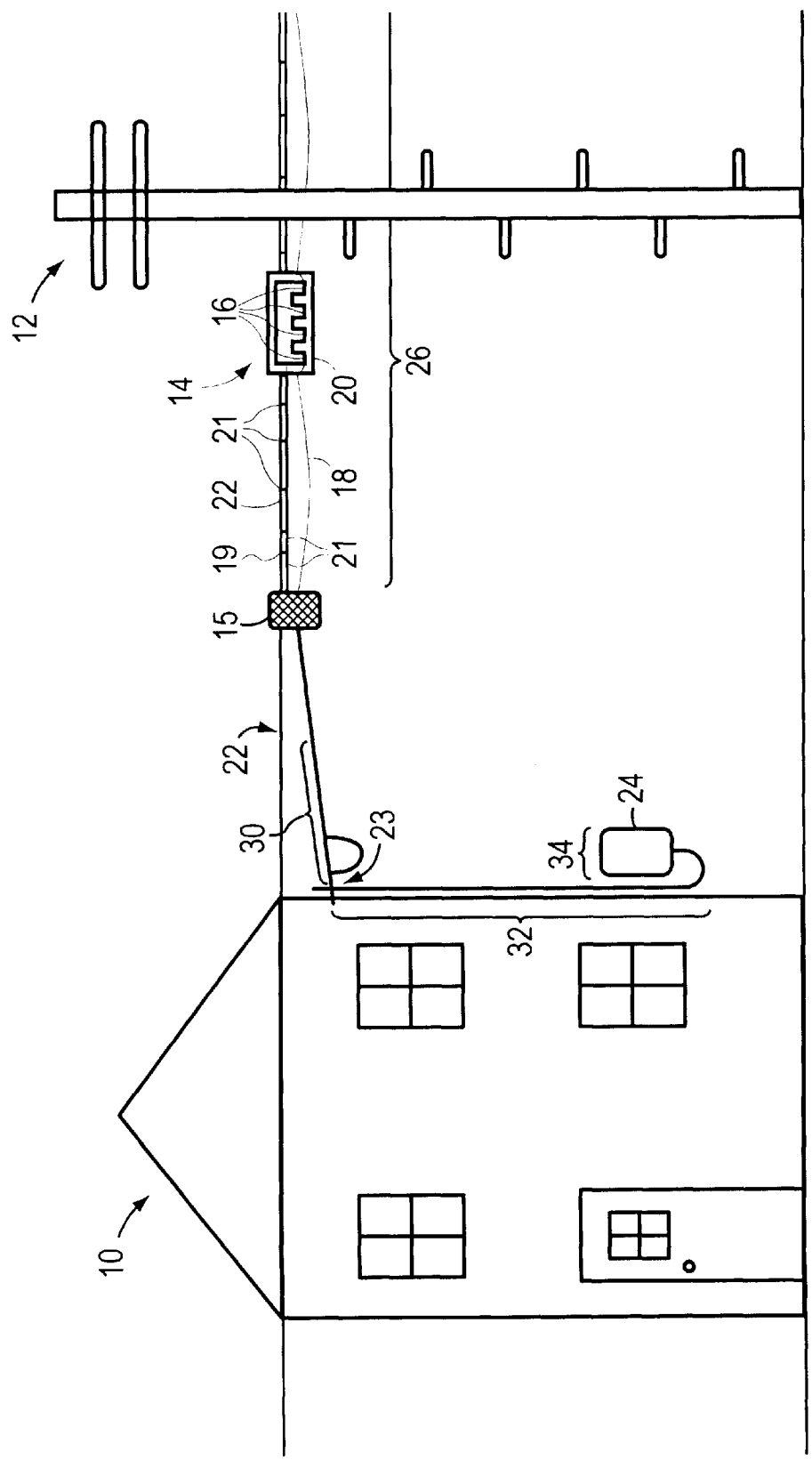
FIG. 1 shows a CATV service installation.
Figure 1A:
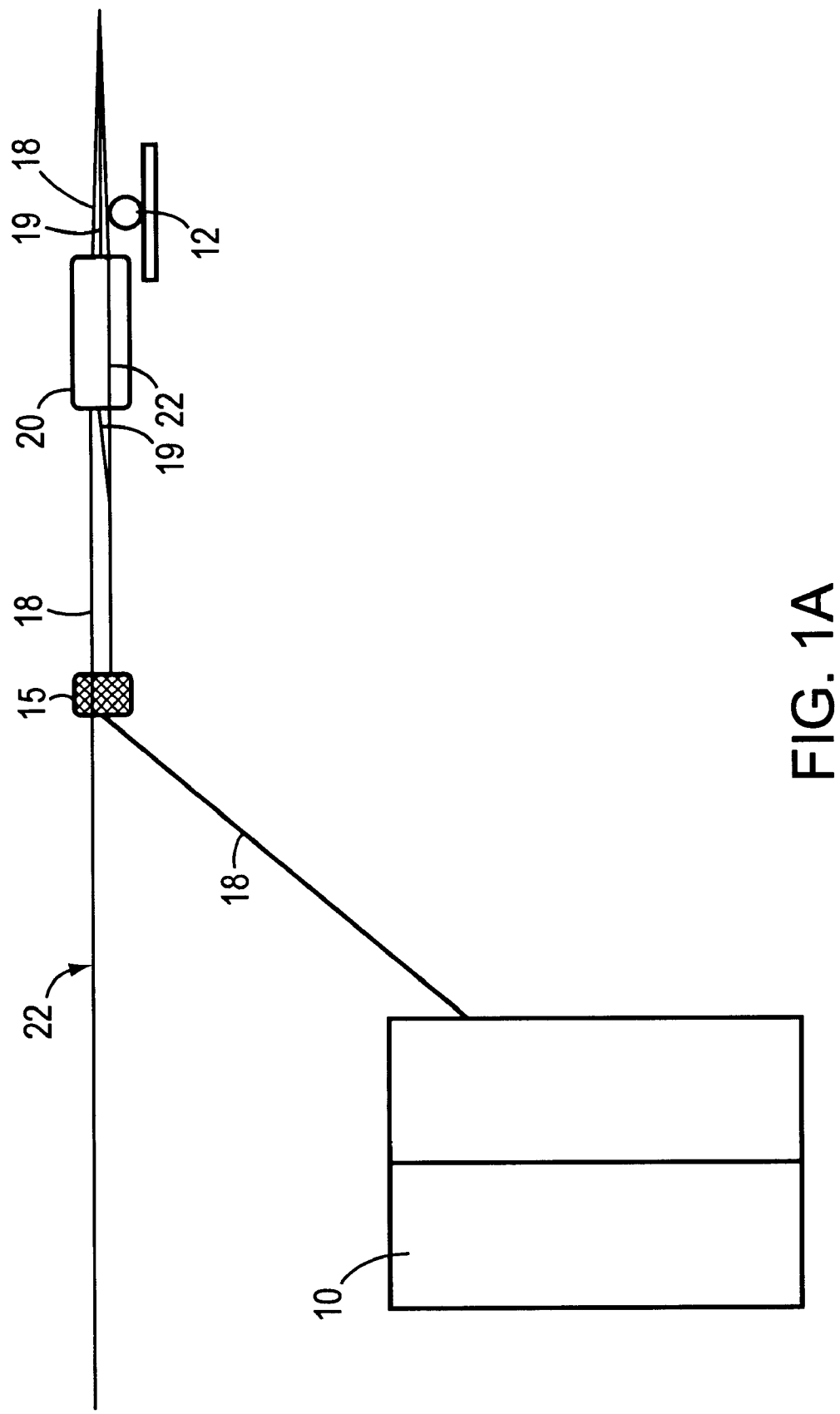
FIG. 1a shows a top view of FIG. 1.

FIG. 1 shows a typical Cable television ("CATV") service installation for a single family home 10. A series of utility poles, like that indicated at 12, deliver the CATV signal to a neighborhood. In FIG. 1, utility pole 12 is behind home 10, shown best in FIG. 1a. Distribution tap 14 is mounted within a high-security housing 20, with housing 20 mounted to a guide stran 22 stretching between utility pole 12 and a utility pole to the left of home 10 (not shown). Hard line cable 19 is connected by clamps, severally indicated at 21, to stran 22. Hard line cable 19 delivers the CATV signal to tap 14. Tap 14 serves as a local distribution unit for the CATV signal. Tap 14 includes a plurality of ports, severally indicated at 16. Each port 16 accepts a single service line 18, which in turn can provide the CATV signal to a single customer. Each service line 18 carries the entire bandwidth of service for the CATV provider at tap 14. For instance, "basic service", "premium services" and even "pay-per-view" channels are all present in the signal carried by service line 18 at tap 14. However, service line 18 is easily accessible to cable either side of housing 20. If the cable thief breaches security line 18 immediately outside housing 20, he can acquire access to the entire spectrum of services offered by the CATV provider.

Service line 18 proceeds from housing box 20, through span clamp 15 and to home 10. Service line 18 connects to the exterior of home 10 at connection point 23, runs down the side of home 10 and into a cable box 24 mounted to the exterior of home 10. Traditionally, cable box 24 includes space for a plurality of filters to be connected to service line 18. These filters eliminate channels from the signal carried by service line 18 not selected by the customer. Accordingly, the signal in service line 18 after passing through these filters contain only a portion of the signal provided to service line 18 at tap 14. This reduced signal is fed into the customer's residential grid that distributes the CATV signal to individual outlets throughout the residence.

The entire length of service line 18 is susceptible to cable theft. However, certain areas are more vulnerable than others. These critical areas are easily reached by a cable thief using household items such as a ladder. For example, in FIG. 1, four critical areas exist along service line 18: (1) any portion within approximately the first six feet to either side of utility pole 12, indicated at 26, (2) approximately the last six feet of service line 18 before connection point 23 on home 10, indicated at 30, (3) the entire length from connection point 23 to cable box 24, indicated at 32, and (4) the length of service line 18 in cable box 24, indicated at 34. Different installations will have different critical areas based on the type of installation and its surroundings.

Each critical area is vulnerable for different reasons. A cable thief can climb pole 12, cut critical area 26 anywhere within reach, crimp on a connector and run a new line to home 10 that does not pass through the filters in cable box 24. Similarly, a cable thief can use a ladder leaning against home 10 to cut critical area 30 anywhere within reach, crimp on a connector and run a new line to house 10 that does not pass through the filters in cable box 24. Critical area 32 can be cut in some instances without the cable thief leaving the ground. Additionally, cable box 24 is an area of vulnerability as cable thieves easily break into most or all known cable boxes and strip away the filters. The present invention identifies and provides extra security for these critical areas.

Figure 2:
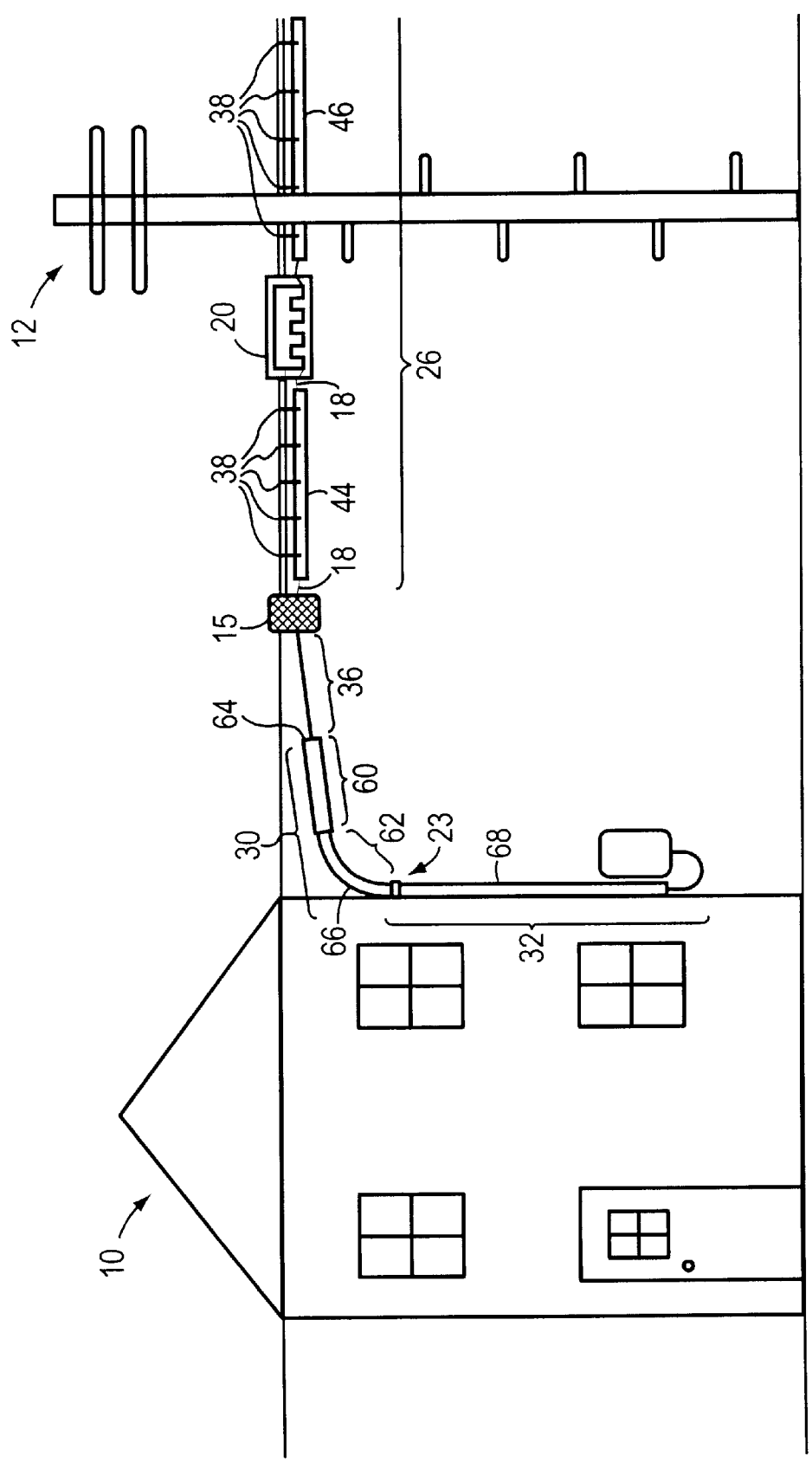
FIG. 2 shows a CATV service installation after application of the present invention.
Figure 2A:
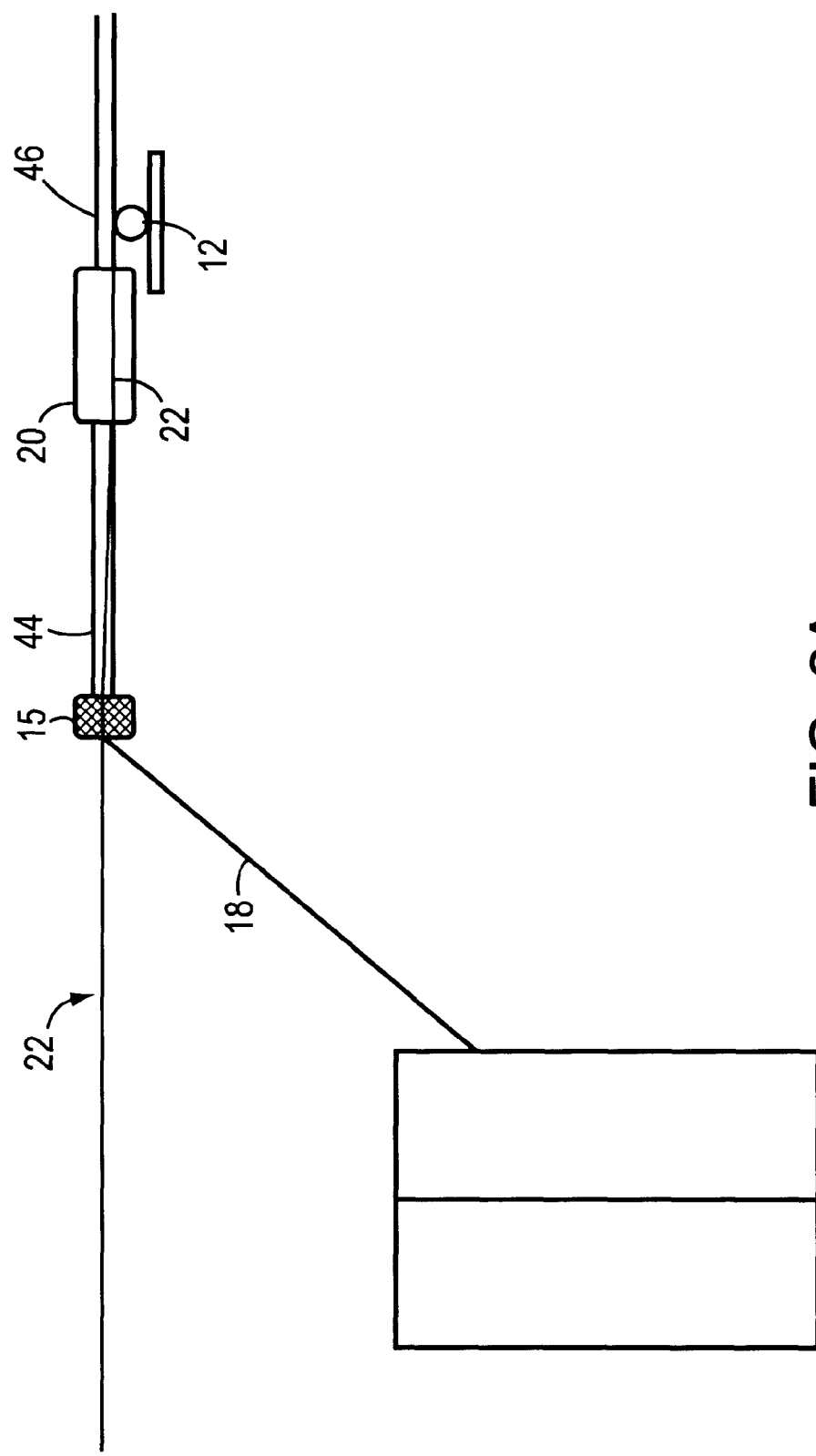
FIG. 2a shows a top view of FIG. 2.

FIGS. 2 and 2(a) shows the CATV service installation of FIG. 1 after application of the present invention. The invention can be applied coincidentally with a new service installation. First, the CATV service installation path (or expected CATV service installation path for a new CATV service installation) is examined to identify critical areas of vulnerability. As discussed earlier, four critical areas exist in the CATV service installation in FIGS. 1 and 2. Area 36 is not identified as a critical area as a cable thief will be hard pressed to reach any portion of area 36 without significant difficulty. Accordingly, it is anticipated the typical cable thief will not attempt to breach the CATV service installation at area 36, or the average person seeking to utilize the cable thief's services will be unable to afford the premium charged for the increased risk.

Figure 3:
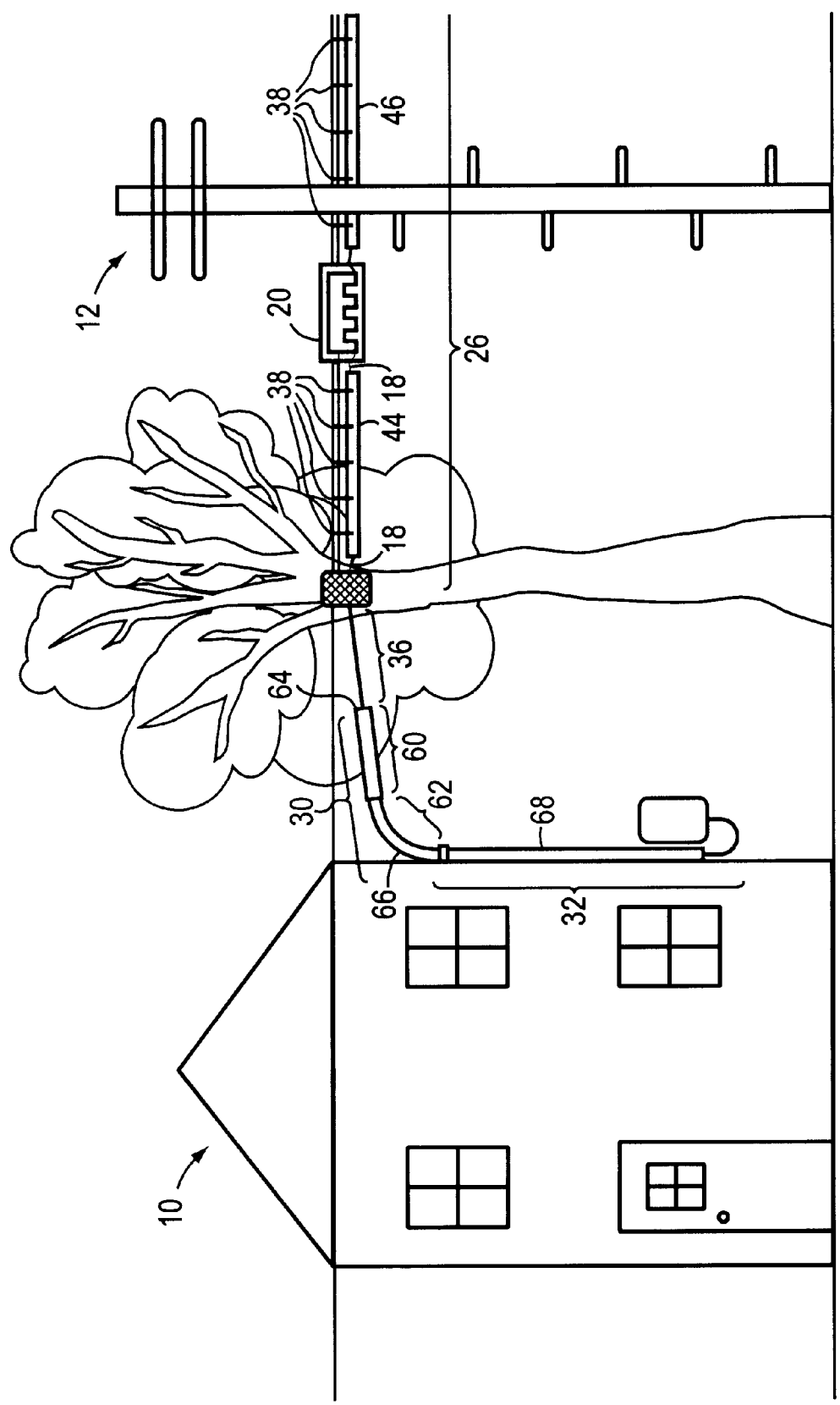
FIG. 3 shows an alternative CATV service installation.
Figure 4:
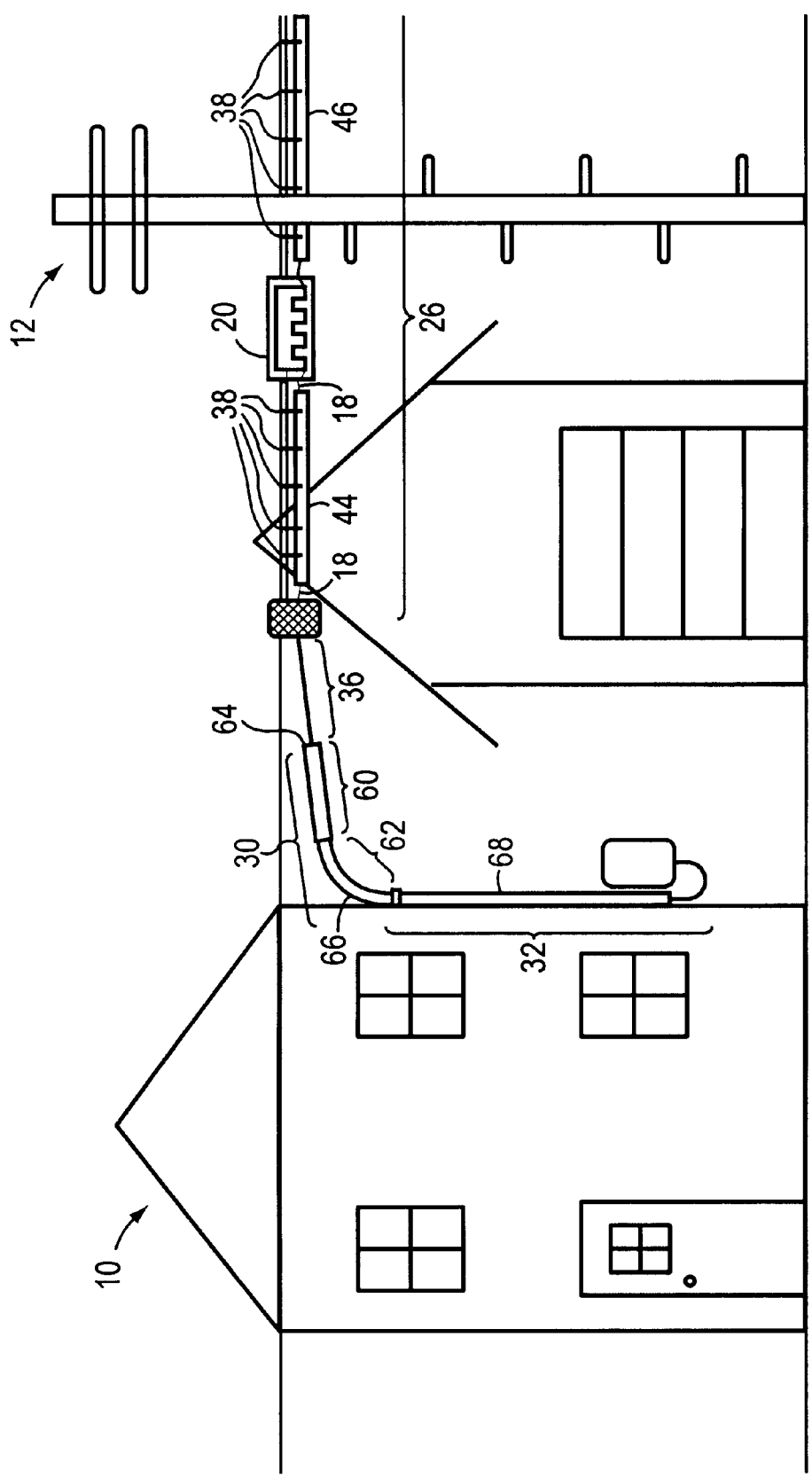
FIG. 4 shows an alternative CATV service installation.

The circumstances and surroundings particular to each CATV service installation will dictate the designation of critical areas. For example, area 36 would be a critical area if a tree (FIG. 3) or a garage (FIG. 4) were close enough to provide the cable thief easy access.

Once the critical areas are identified, a determination is made on how to best protect each critical area. One consistent goal is to provide a protective means that is relatively inexpensive, both in components costs and deployment costs (e.g., installation time, installation difficulty, and necessary tools).

Critical area 26 is a portion of service line 18 suspended above the ground. Accordingly, a light-weight protective means is desired. Furthermore, the protective means for critical area 26 must provide a high level security as it is easily reached by climbing pole 12 with little risk to the cable thief, and is therefore a preferred location for splicing. Referring to FIGS. 2 and 2(a), critical area 26 of service line 18 runs within light-weight polyvinyl chloride (PVC) tubing 44 and 46 extending to the left and right of housing 20 to the ends of area 26. Tubing 44 and 46 are suspended from stran 22 by clamps 38 and positioned flush against housing 20 at one end and a span clamp at the other, thus preventing movement of tubing 44 or 46 along service line 18.

Figure 5:
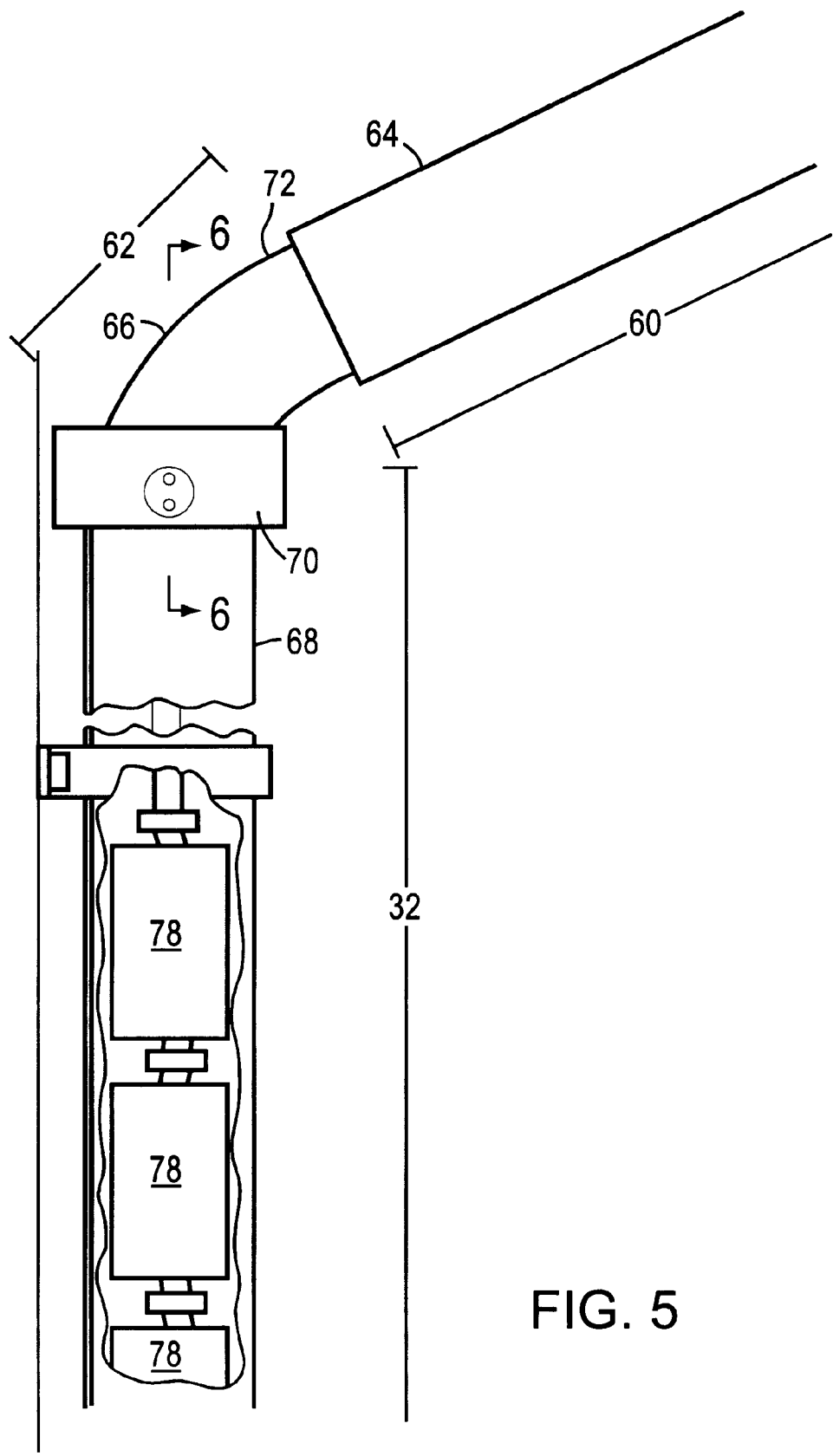
FIG. 5 shows the protective means for a critical area of a service line path.
Figure 6:
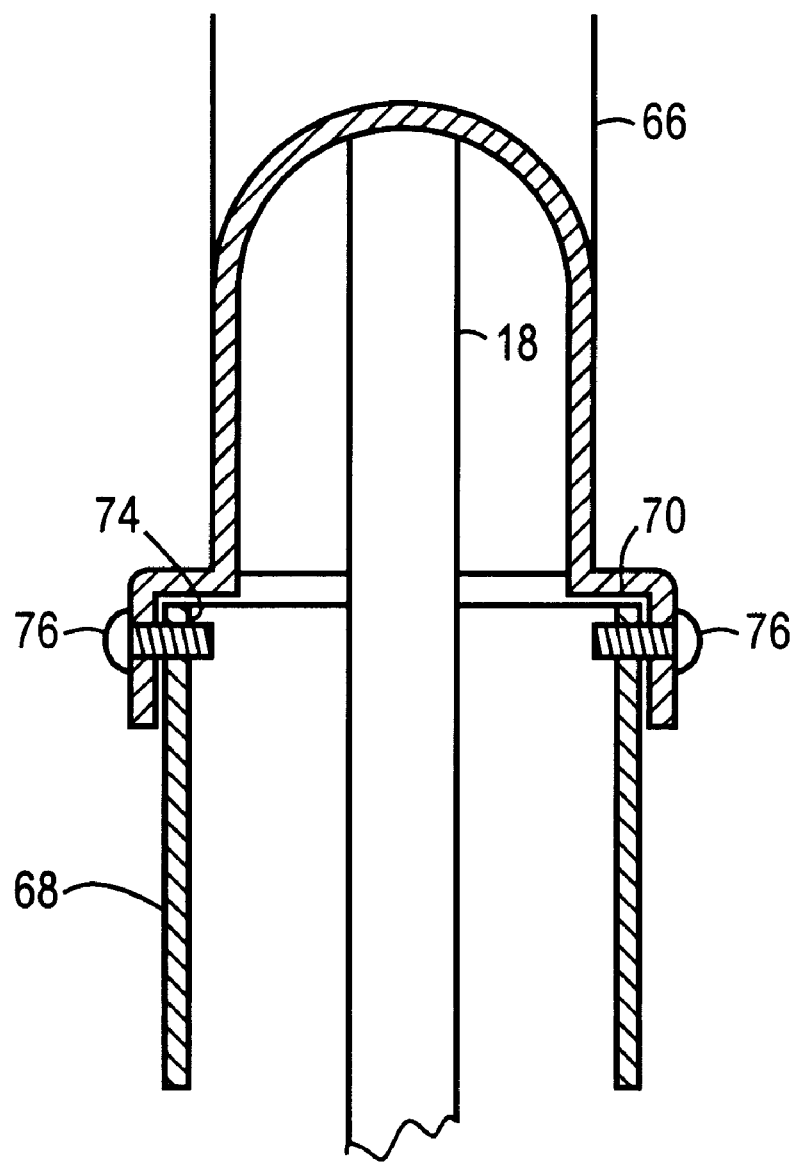
FIG. 6 is a cross-sectional view of the portion of the CATV service installation of FIG. 2 along line 6—6.

As shown in FIGS. 2 and 5, critical area 30 composes two sub-portions: (1) critical sub-portion 60, the substantially straight length of critical area 30, and (2) critical sub-portion 62, the bend leading to critical area 32. A length of PVC tubing 64 threaded at its ends sheathes approximately six feet of critical sub-portion 60. Critical sub-portion 62 is sheathed within a length of flexible metal conduit 66. At critical area 32, service line 18 runs within a sturdy metal conduit 68, such as electrical conduit. A heavy conduit can be used as it will be mounted directly to home 10. Conduit 68 and tubing 64 are connected by flexible conduit 66, which has at its ends a collar 70 and a threaded end 72. An appropriate polymer solvent is applied to threaded end 72. When threaded end 72 and the PVC threads of tubing 64 mate, the polymer solvent contacts the PVC threads which then dissolve and re-harden around the threads of end 72 preventing the removal of conduit 68 from tubing 64 without breaking the two apart. Adverting to FIG. 6, collar 70 connects to end 74 of conduit 68 using security screws, severally indicated at 76, having non-standard heads to prevent tampering.

The filters, severally indicated at 78, are installed within conduit 68, which is substantially more difficult to breach than cable box 24. No protective means is provided for service line 18 after filters 72 because the signal carried after by service line 18 filter 72 only includes those channels subscribed to by the customer.

Accordingly, all critical areas of service line 18 between tap 14 and the customer's residential CATV service grid are provided extra protection to deter cable theft. Although preventing cable theft in all instances is impossible, the present invention significantly increases the effort needed to steal CATV service. Importantly, the current invention accomplishes this both for pre-existing CATV installation and new CATV service installations with very little cost for materials and installation. The total cost for the protective means shown in FIG. 2 is approximately $30.00 per house. An experienced cable lineman should be able to install the security system shown in FIG. 2 by himself using only those tools commonly used by cable linemen in approximately one hour. Accordingly, the high cost of exotic electronic equipment, as well as the cost to install this new equipment, is avoided.

Modifications

Although preferred embodiments of the instant invention have been described, a person of ordinary skill in the art would find modifications to what has been described obvious. Such modifications could include the adoption of the method and system for other utility services delivered by cable (e.g., telephone service and electrical service). In addition, although exemplary protective means have been described, the specific protective means used will be dictated by the surroundings of the CATV service installation.

What is claimed:

1. A method to deter a theft of a utility service delivered by a service line, comprising:

identifying a critical area of said service line between a local distribution unit and the connection to a customer;

selecting a protective means based on the specific characteristics of said critical area making it vulnerable to tampering; and applying said protective means to said critical area, said protective means including sheathing said service line;

whereby theft of said utility service is deterred.

2. The method of claim 1 wherein said critical area is a length of said service line easily reached using common household items.

3. The method of claim 1 wherein said protective means is relatively inexpensive.

4. The method of claim 1 wherein a plurality of critical areas exist.

5. The method of claim 1 wherein said method is used with a pre-existing service installation to a customer.

6. The method of claim 1 wherein said method is used when initially providing a service installation for a customer.

7. The method according to claim 1 wherein said protective means is a security box enclosing a portion of said service line.

8. The method according to claim 3 wherein said critical area is suspended above the ground and said protective means is a length of light-weight sheathing.

9. The method according to claim 3 wherein said critical area runs along a structure, and said protective means is a length of metal conduit mounted to said structure used as sheathing for said service line.

10. The method according to claim 9 wherein said metal conduit is inexpensive.

11. The method according to claim 9 wherein said metal conduit is adapted to accommodate accessory devices used to assist in the delivery of said service.

12. The method according to claim 11 wherein said service is cable television and said accessory devices are channel filters.

13. A system to deter theft of a utility delivered by a service line, comprising:

a local distribution unit;

a customer security unit;

a suspended service line running from said local distribution unit to a structure, along at least a portion of said structure and to said customer security unit;

said customer security unit mounted on said structure;

said local distribution unit and said customer security unit deter unauthorized tampering of items substantially enclosed within said units; and a first critical area of said service line running within a first sheath adapted to deter unauthorized tampering of items substantially enclosed within said first sheath, the first critical area between said local distribution unit and said structure.

14. The system of claim 13 wherein said service line is a co-axial cable delivering cable television service.

15. The system of claim 13 wherein a plurality of critical areas exist along said service line between said local distribution and said structure.

16. The system of claim 13 having two critical areas and wherein said second critical area of said service line runs along said structure within a second sheath adapted to deter unauthorized tampering of items substantially enclosed within said second sheath.

17. The system of claim 13 wherein said service line connects to a filter and said second sheath substantially encloses said filter.

18. The system of claim 17 wherein a plurality of filters are connected in series with said service line.

19. The system of claim 13 wherein said second sheath is a conduit made of metal fixedly mounted to said structure.

20. The system claim 13 wherein said first sheath comprises two parts, a flexible metal conduit fixedly connected to said local distribution unit at one end and fixedly connected to a length of light-weight material at the other end.

21. The system of claim 20 wherein said light-weight material is polyvinyl chloride.

22. The system of claim 21 wherein said first sheath covers the portion of cable immediately outside said local distribution unit for a distance of approximately six feet.

23. A system to deter theft of a utility delivered by a service line, comprising:

a local distribution unit;

a customer security unit;

a suspended service line running from said local distribution unit to a structure, along at least a portion of said structure and to said customer security unit;

said customer security unit mounted on said structure;

said local distribution unit and said customer security unit deter unauthorized tampering of items substantially enclosed within said units; and a first critical area of said service line running within a sheath extending upwardly from said customer security unit and fixed to the side of the structure to prevent tampering of the service line within said sheath.

24. A system as claimed in claim 23, wherein the service line includes at least one filter coupled to the service line and contained within said sheath.

\* \* \* \* \*